US011451447B1

(12) United States Patent
Jangam et al.

(10) Patent No.: US 11,451,447 B1
(45) Date of Patent: Sep. 20, 2022

(54) CONTAINER WORKLOAD MONITORING AND TOPOLOGY VISUALIZATION IN DATA CENTERS

(71) Applicant: Cisco Technology, Inc., San Jose, CA (US)

(72) Inventors: Anil B. Jangam, Milpitas, CA (US); Shyam N. Kapadia, San Jose, CA (US); Murthy N. Bhetanabhotla, Sunnyvale, CA (US); Santa Dasu, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/951,673

(22) Filed: Nov. 18, 2020

(51) Int. Cl.
*H04L 41/12* (2022.01)
*G06F 9/455* (2018.01)
*H04L 41/0893* (2022.01)
*H04L 41/22* (2022.01)

(52) U.S. Cl.
CPC .......... *H04L 41/12* (2013.01); *G06F 9/45558* (2013.01); *H04L 41/0893* (2013.01); *H04L 41/22* (2013.01)

(58) Field of Classification Search
CPC combination set(s) only.
See application file for complete search history.

(56) References Cited

U.S. PATENT DOCUMENTS

| | | | | |
|---|---|---|---|---|
| 10,560,379 B1* | 2/2020 | Ghosh | ................. | H04L 43/0888 |
| 11,044,179 B1* | 6/2021 | Bettaiah | ................. | H04L 41/147 |
| 2010/0138751 A1* | 6/2010 | Kumar | ................. | H04L 67/025 |
| | | | | 715/736 |
| 2016/0357424 A1* | 12/2016 | Pang | ................. | G06F 9/45558 |
| 2018/0062916 A1* | 3/2018 | Eda | ................. | H04L 67/1008 |
| 2019/0028352 A1* | 1/2019 | Rao | ................. | H04L 12/44 |
| 2019/0235906 A1* | 8/2019 | Asawa | ................. | G06F 9/4875 |
| 2020/0042406 A1* | 2/2020 | Natanzon | ................. | G06F 11/1482 |
| 2020/0110647 A1* | 4/2020 | Souche | ................. | G06F 11/079 |
| 2021/0064442 A1* | 3/2021 | Alluboyina | ................. | G06F 9/5083 |
| 2021/0073065 A1* | 3/2021 | Bhatnagar | ................. | G06F 11/079 |

OTHER PUBLICATIONS

"WeaveScope", weave.works, 7 pages, accessed online Nov. 9, 2020 <https://www.weave.works/docs/scope/latest/features/>.
Kubernetes (K8s) Dashboard, Web UI (Dashboard), Accessed Online Nov. 9, 2020 ,: 8 pages <https://kubernetes.io/docs/tasks/access-application-cluster/web-ui-dashboard/>.
GitHub, "SPEKT8" Acccessed Online Feb. 18, 2021, 4 pages [<https://github.com/spekt8/spekt8/blob/master/README.md>].

* cited by examiner

*Primary Examiner* — Tonia L Dollinger
*Assistant Examiner* — Joseph M Cousins
(74) *Attorney, Agent, or Firm* — Patterson + Sheridan, LLP (57) ABSTRACT

Techniques for container management and topology visualization are provided. A network topology of a data center is determined, where the network topology includes a plurality of physical servers. A plurality of containers executing in the data center is identified, and for each respective container of the plurality of containers, a respective server from the plurality of physical servers that is executing the respective container is determined. An augmented network topology is generated by correlating the network topology and the determined server executing each container, where the augmented network topology indicates relationships among the plurality of containers and physical resources in the data center.

20 Claims, 8 Drawing Sheets

CONTAINER WORKLOAD MONITORING AND TOPOLOGY VISUALIZATION IN DATA CENTERS

STATEMENT REGARDING POSSIBLE PRIOR DISCLOSURES BY THE INVENTOR OR A JOINT INVENTOR

The following may constitute prior disclosures and are being submitted under 35 USC § 102(b)(1)(A):

DISCLOSURES

Using Container Visualization in Cisco DCNM, Release 11.3(1), Updated Jan. 16, 2020—https://www.cisco.com/c/en/us/td/docs/switches/datacenter/sw/11_3_1/videos/container_visualization.html Cisco DCNM LAN Fabric Configuration Guide, Release 11.3(1), Topology, Container Orchestrator, Updated Nov. 12, 2020—https://www.cisco.com/c/en/us/td/docs/switches/datacenter/sw/11_3_1/config_guide/lanfabric/b_dcnm_fabric_lan/topology.html #concept_swd_rfw_xj_b Cisco DCNM LAN Fabric Configuration Guide, Release 11.4(1), Topology, Container Orchestrator, Updated Nov. 12, 2020—https://www.cisco.com/c/en/us/td/docs/switches/datacenter/sw/11_4_1/config_guide/lanfabric/b_dcnm_fabric_lan/topology.html #concept_swd_rfw_xj_b

TECHNICAL FIELD

Embodiments presented in this disclosure generally relate to container workload monitoring. More specifically, embodiments disclosed herein relate to correlating and visualizing network topology data and container information.

BACKGROUND

Many data center deployments have a mixture of various kind of workloads distributed across containers, virtual machines, bare-metal servers, and the like. Typically, in order to troubleshoot any issues in the deployment, it is important to know the location of the server(s) on which the problematic workload resides. From there, one can investigate the compute, storage, and network resources that are servicing that workload. In many instances, the switch attached to the workload (e.g., a top-of-rack (ToR) switch) is a good starting point.

In data center deployments, however, each workload may be executing via a wide variety of implementations. For example, the workload may be directly running on a physical server (a bare-metal server) attached to the switch, or may be running on servers attached to a fabric extender. Additionally, in some deployments, the workload may execute on blade servers attached via blade-switches to the main (e.g., ToR) switch. Further, the virtual machines may utilize virtual network interface cards, which are typically attached to virtual switches on hypervisors running on virtualized servers. In the case of containerized workloads, the containers may similarly be running on virtual machines that in turn are running on virtualized servers. Additionally, such virtualized servers may be blade servers that in turn are behind a blade switch. Ultimately, the topology of the data center is complex and ever-changing, making it difficult or impossible to adequately map each workload to the physical components serving them. This can significantly impede a wide variety of important data center tasks, including troubleshooting.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

One embodiment presented in this disclosure provides a method. The method comprises: determining, by a management component in a data center, a network topology of the data center, wherein the network topology includes a plurality of physical servers; identifying, by the management component, a plurality of containers executing in the data center; determining, for each respective container of the plurality of containers, a respective server from the plurality of physical servers that is executing the respective container; and generating, by the management component, an augmented network topology by correlating the network topology and the determined server executing each container, wherein the augmented network topology indicates relationships among the plurality of containers and physical resources in the data center.

Another embodiment presented in this disclosure provides a non-transitory computer-readable medium containing computer program code that, when executed by operation of one or more computer processors, performs an operation. The operation comprises: determining, by a management component in a data center, a network topology of the data center, wherein the network topology includes a plurality of physical servers; identifying, by the management component, a plurality of containers executing in the data center; determining, for each respective container of the plurality of containers, a respective server from the plurality of physical servers that is executing the respective container; and generating, by the management component, an augmented network topology by correlating the network topology and the determined server executing each container, wherein the augmented network topology indicates relationships among the plurality of containers and physical resources in the data center.

Another embodiment presented in this disclosure provides a system comprising: one or more computer processors; and a memory containing a program which when executed by the one or more computer processors performs an operation. The operation comprise: determining, by a management component in a data center, a network topology of the data center, wherein the network topology includes a plurality of physical servers; identifying, by the management component, a plurality of containers executing in the data center; determining, for each respective container of the plurality of containers, a respective server from the plurality of physical servers that is executing the respective container; and generating, by the management component, an augmented network topology by correlating the network topology and the determined server executing each container, wherein the augmented network topology indicates relationships among the plurality of containers and physical resources in the data center.

EXAMPLE EMBODIMENTS

Embodiments of the present disclosure provide techniques to gather and correlate data relating to workloads and physical topologies in data centers in order to present cohesive visualizations of the overarching deployment. In some embodiments, data can be collected over time and/or in real-time to learn from historical patterns of utilization in the data center (e.g., bandwidth usage, compute resources available at various times and on various nodes, and the like). In some embodiments, the system, can collect updated data continuously or periodically (e.g., every five minutes). In another embodiment, the system collects data whenever a change occurs (allowing the system to immediately learn about the effects of the change). By connecting the physical resource usage to specific workloads, some embodiments of the present disclosure enable enhanced administration of the data center. For example, embodiments may allow the deployment to be reconfigured dynamically (e.g., by instantiating, terminating, moving, or otherwise reconfiguring workloads and virtual or physical components) to account for shifting patterns. These configurations may be performed automatically or manually in various embodiments. By providing this cohesive and dynamic data correlations, embodiments of the present disclosure can thereby improve the operations of the data center. These improves can include, without limitation, increased throughput, reduced latency, power consumption, and downtime, and the like.

In some embodiments, workloads are deployed in containers that are orchestrated in the deployment by one or more centralized controllers. In one embodiment, Kubernetes serves as the basis for the container orchestration. In various embodiments, the container system enables automated application deployment, scaling, and management using microservices realized via a set of one or more containers in a cluster. In one embodiment, the orchestrator can be utilized to monitor master and worker nodes in the cluster, including the state of each container, the services on each, load balancers, and the like.

In embodiments, the nodes themselves may be virtual machines, or bare-metal servers, or any other suitable configuration. Typically, the containerized workloads residing on the different nodes have the appropriate network connectivity and compute resources provided by the node. However, the information available to the orchestrator is inadequate in a wide variety of situations, including debugging or troubleshooting container issues, particularly networking-specific issues, such as tracing a faulty inter-container network link. This is because the orchestrator can view the states of individual workloads and containers, but there is no correlation or visibility provided with respect to the physical network components and connectivity. Embodiments of the present disclosure provide techniques to collect this topology information and correlate it with the container information in order to augment the available data and improve the operations of the deployment.

Figure 1:
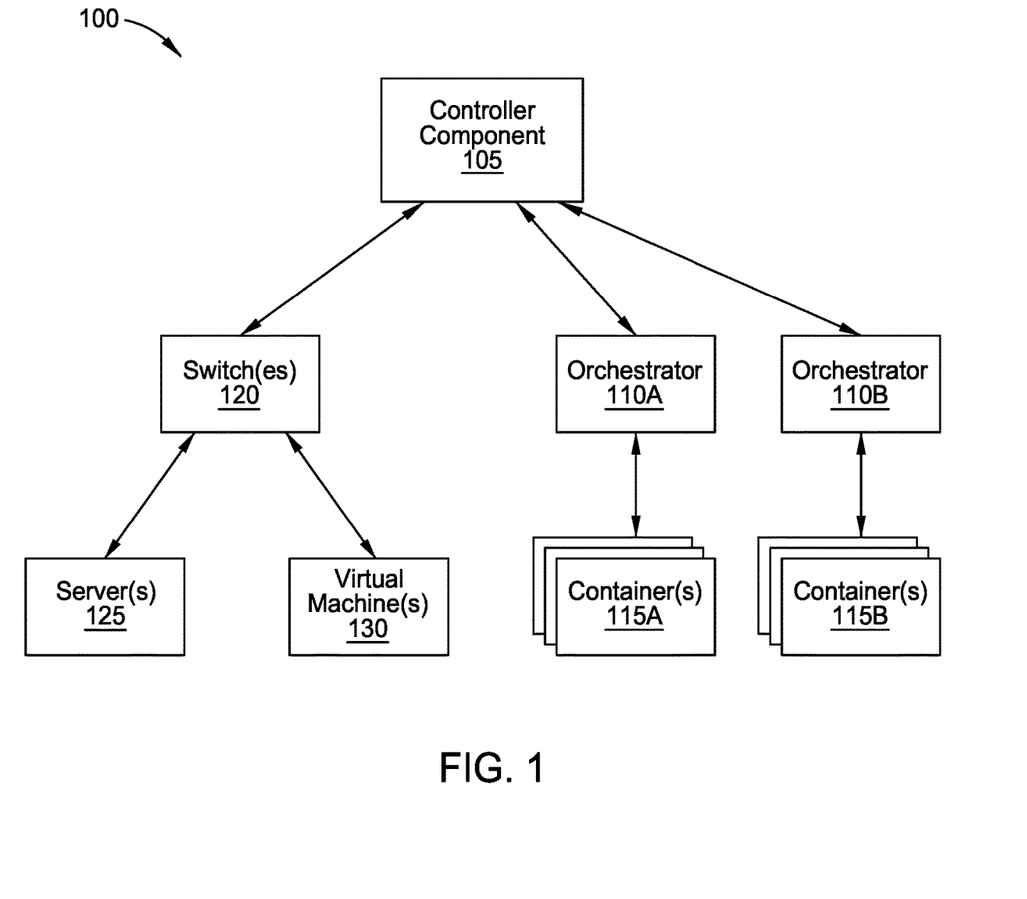
FIG. 1 illustrates a data center including a variety of physical and virtual components, according to some embodiments disclosed herein.

FIG. 1 illustrates a Data Center 100 including a variety of physical and virtual components, according to some embodiments disclosed herein. In the illustrated embodiment, a Controller Component 105 (e.g., a network manager for the data center) is communicatively coupled with one or more Switches 120 (e.g., leaf nodes in a spine-leaf deployment, or virtual switches for a virtual server). In embodiments, the Switches 120 can include physical or virtual switches. The Switches 120 generally provide network connectivity for the components of the Data Center 100. For example, the Switches 120 may include ToR switches on each rack, such that each switch can provide an interlink between racks in the Data Center 100, as well as to external components and systems (e.g., to the Internet).

In the illustrated embodiment, the Switches 120 are coupled to one or more Servers 125 and/or Virtual Machines 130. For example, physical switches may couple to physical Servers 125, while virtual switches may connect to Virtual Machines 130. In embodiments, this connectivity can be complex and cross a number of levels in the hierarchy of the Data Center 100. For example, a ToR Switch 120 may connect to a Server 125, which hosts a Virtual Machine 130, which executes a container or workload. Another ToR Switch 120 may connect to a fabric extender switch, which connects to a server hosting a virtual machine and/or container. Further, the ToR switch and/or fabric extender may connect to a blade switch, which provides connectivity to a blade server that hosts virtual machines and/or containers. Of course, any variety of connections may be present in a given deployment. Generally, the Switches 120, Servers 125, and Virtual Machines 130 provide computational and network resources to execute Containers 115.

As illustrated, the Controller Component 105 is additionally coupled with one or more Orchestrators 110A-B, each responsible for managing a respective cluster of Containers 115A-B. In some embodiments, the Controller Component 105 can also interface with orchestrators for each virtual machine. The Containers 115 are logical environments (sometimes referred to as pods) that can host various workloads, such as applications or databases in the Data Center 100. In an embodiment, the Orchestrators 110A-B can manage the operations of the Containers 115 in its cluster.

This can include initiating and halting containers, moving containers, managing the workloads, providing load balancing, and the like.

In embodiments, each Orchestrator 110 can retrieve state information about its Containers 115, including whether it is running properly (as opposed to paused, crashed, down, restarting, or any other state), what its physical address is (e.g., what Server 125 it is located on), and the like. In some embodiments, the state information can include resource utilization of the Container 115. This can include, by way of example and not limitation, memory and storage utilization (e.g., used and available memory and storage), processing capacity (e.g., used and available clock cycles or processing units), bandwidth utilization (e.g., used and available bandwidth across one or more links that provide connectivity to the Container 115), and the like.

In one embodiment, the Orchestrator 110 utilizes one or more application programming interfaces (APIs) provided by each Container 115 as the discovery mechanism to retrieve this state information from each Container 115. Using this information, the Orchestrator 110 can understand the collective state of the cluster (e.g., resource utilization) and respond reactively or proactively to shifting loads. However, as discussed above, the Orchestrator 110 is generally unaware of the physical connectivity between components in the network (e.g., which switches or links connect any given servers). This makes it impossible for the Orchestrator 110 to diagnose and respond to many networking issues.

In some embodiments, the Controller Component 105 (or some component therein) can onboard the clusters (or Container(s) 115) by interacting with the Orchestrator(s) 110. This allows the Controller Component 105 to retrieve the operational state of the each cluster and its resources including the nodes, services, namespaces, and containers associated with each cluster.

In an embodiment, the Controller Component 105 additionally utilizes one or more link layer neighbor discovery protocols to determine the network topology of the deployment. For example, the Controller Component 105 may utilize Link Layer Discovery Protocol (LLDP) or Cisco Discovery Protocol (CDP). Generally, link layer discovery protocols allow each component in the deployment to identify its immediate neighbors. That is, each component can query its immediate neighbors (components that are connected by physical links or cables) to retrieve the identifier or other relevant information of the neighbor. For example, each Switch 120 can determine the identity (e.g., the media access control (MAC) address) of each neighbor device (e.g., of the attached Servers 125). In some embodiments, the Controller Component 105 (or a network controller) instructs each component to identify its neighbors in order to determine the overall topology.

Utilizing this neighbor information, the Controller Component 105 can build a network topology reflecting the connections among the physical devices or components in the Data Center 100. In embodiments, the Controller Component 105 can then leverage information relating to the network topology (e.g., from a controller) and the container information (e.g., provided by the Orchestrators 110) to build a hierarchical network topology indicating the connectivity of the physical components and the individual Virtual Machines 130 and Containers 115, and how they are connected to the fabric or switch network of the Data Center 105.

In this way, the Controller Component 105 can correlate the information available to the network controller (the topology information retrieved using link layer discover protocol(s)) and the information provided by the container Orchestrator(s) 110 and/or virtual machine orchestrators based on the identifier of each Server 125. That is, the Controller Component 105 can determine the system identifier of each Server 125 (provided by link layer discovery protocols) and correlate that data with the server information indicated by the Orchestrators 110 (e.g., the indication of the server executing each Container 115). This allows the Controller Component 105 to augment the network topology to include the connectivity of each Container 115 in the deployment. In this way, the actual physical hardware that supports each Container 115 is determined, and the other components connected to that hardware (e.g., the relevant Switches 120) can be identified.

In an embodiment, this augmented network topology indicates end-to-end network connectivity and the relationships among the Containers 115, and between each Container 115 and broader network (and external networks). The augmented topology diagram can provide granular network connectivity details (e.g., indicating the virtual endpoint connecting a given Container 115 to the host virtual bridge).

Additionally, in some embodiments, the augmented topology indicates the operational state of each Container 115 and its resource consumption (such as the CPU and memory consumption) on the host Server 125 for the Container 115. Similarly, in an embodiment, the augmented topology indicates the bandwidth of each node, and its distribution within the node contributed by each Container 115 running on it (e.g., the bandwidth consumed by each Container 115).

In some embodiments, by using a time-series database, the Controller Component 105 can capture historical data from the deployment, which aids fault analysis and forensics and may improve response to future concerns. For example, in one embodiment, the system may learn patterns of utilization in one or more nodes that precede failures in the system. When the Controller Component 105 subsequently identifies such a pattern, in some embodiments, it can pro-actively respond by reconfiguring the deployment (e.g., starting up new nodes, migrating Containers 115, and the like) to prevent failure. Further, in some embodiments, the Controller Component 105 can provide a tabular view of the resources/containers in the deployment, allowing users to filter for specific resources to visualize the deployment.

Figure 2A:
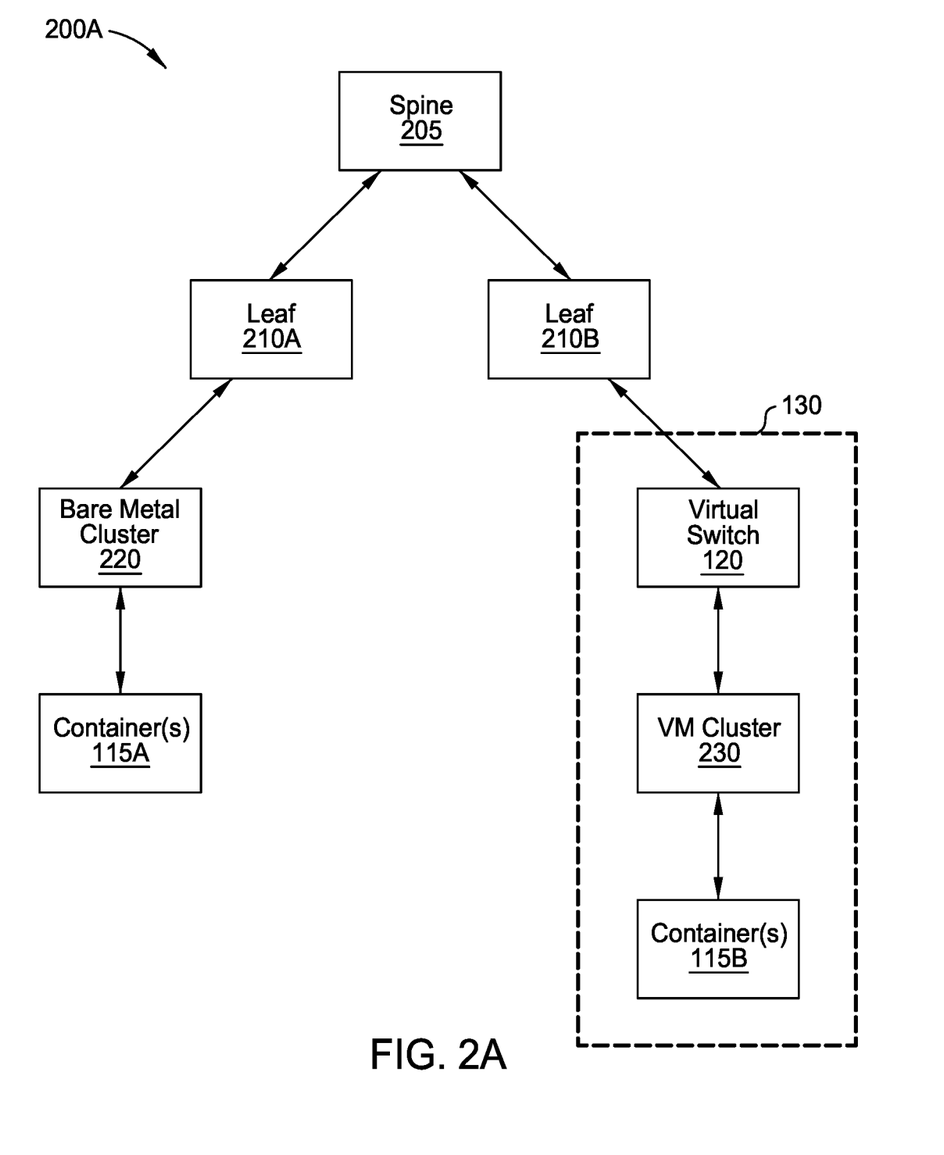
FIG. 2A depicts a network topology for a data center including a variety of physical and virtual components, according to some embodiments disclosed herein.

FIG. 2A depicts a Network Topology 200A for a data center including a variety of physical and virtual components, according to some embodiments disclosed herein. In some embodiments, the Network Topology 200A is output on a graphical user interface (GUI). In one embodiment, the Network Topology 200A is an augmented topology generated by a management component to indicate the connectivity and relationships among physical components, virtual components, and Containers 115 where work is performed. For example, the connectivity between physical components and devices may be identified using a link layer discovery protocol. Additionally, the physical components executing each Container 115 may be identified by querying the orchestrators. By correlating this data, the management component can map the resources and connectivity of each container.

In embodiments, the Network Topology 200A can include Containers 115 from multiple individual clusters (e.g., controlled by separate orchestrators). In the illustrated Network Topology 200A, a Spine 205 is communicatively coupled with two Leaves 210A-B. Although two Leaves 210 are depicted, in embodiments, there may of course be any number of leaf nodes in the deployment. Additionally, although the illustrated Network Topology 200A is a spine-leaf fabric, any physical deployment can be evaluated using embodiments of the present disclosure.

As illustrated, each Leaf 210 is communicatively coupled with zero or more other components. The Leaves 210 generally provide connectivity to sub components such as physical Servers 125 (including blade servers) and virtual machines. In some embodiments, virtual machines can be hosted on physical servers, and receive connectivity via server Leaf 210. Thus, the topology can include any number and variety of components and connections, both physical and virtual.

In the illustrated embodiment, the Leaf 210A provides connectivity for a Bare Metal Cluster 220 hosting a set of Containers 115A. That is, the Containers 115A belong to a first cluster (Bare Metal Cluster 220) and are being executed on a physical server (as opposed to a virtual machine) that is connected to the Leaf 210A. In this way, by correlating data from multiple sources, the Network Topology 200A can be used to identify the components (e.g., the particular switch) that support the Bare Metal Cluster 220 (and each Container 115A therein). Thus, if any communication issues arise for the cluster, the Network Topology 200A can be used to identify the relevant components and troubleshoot the concerns.

Further, as illustrated, the Leaf 210B supports a Virtual Machine 130, which includes a Virtual Switch 120 and VM Cluster 230. The Virtual Machine 130 hosts a set of Containers 115B in the VM Cluster 230. That is, the Containers 115B execute on one or more virtual machines in the VM Cluster 230, which is hosted by one or more physical servers. As above, using the augmented Network Topology 200A, users can therefore identify which physical components are relevant to any network concerns for the VM Cluster 230. For example, if the VM Cluster 230 is suffering connectivity issues, the user can refer to the Network Topology 200A to easily identify which physical components (e.g., which Leaf 210) may be relevant or at fault.

In one embodiment, the Containers 115B are organized, aggregated, and/or depicted under a particular resource or node, such as a namespace. In some embodiments, the way the Containers 115B (and other resources) are aggregate and displayed can be selected by the user. For example, in one such embodiment, the Network Topology 200A may depict the Containers 115 organized by service (e.g., aggregated within service groups, where each service has a front end node that distributes work to the Containers 115 in the service). As another non-limiting example of a resource that can be depicted in the topology, the Containers 115 may be aggregated and displayed based on an ingress view.

Although not included in the illustrated embodiments, in some embodiments the Network Topology 200A additionally indicates utilization and other information about each node and/or connection. For example, the Network Topology 200A may depict each communication link using various colors or intensities (e.g., a heat map) based on the bandwidth over the link (overall, or as a percentage of the maximum bandwidth). Similarly, the Network Topology 200A may color or otherwise change the depiction of each component (e.g., each switch or server) based on its utilization (e.g., memory usage, processor usage, and the like).

Figure 2B:
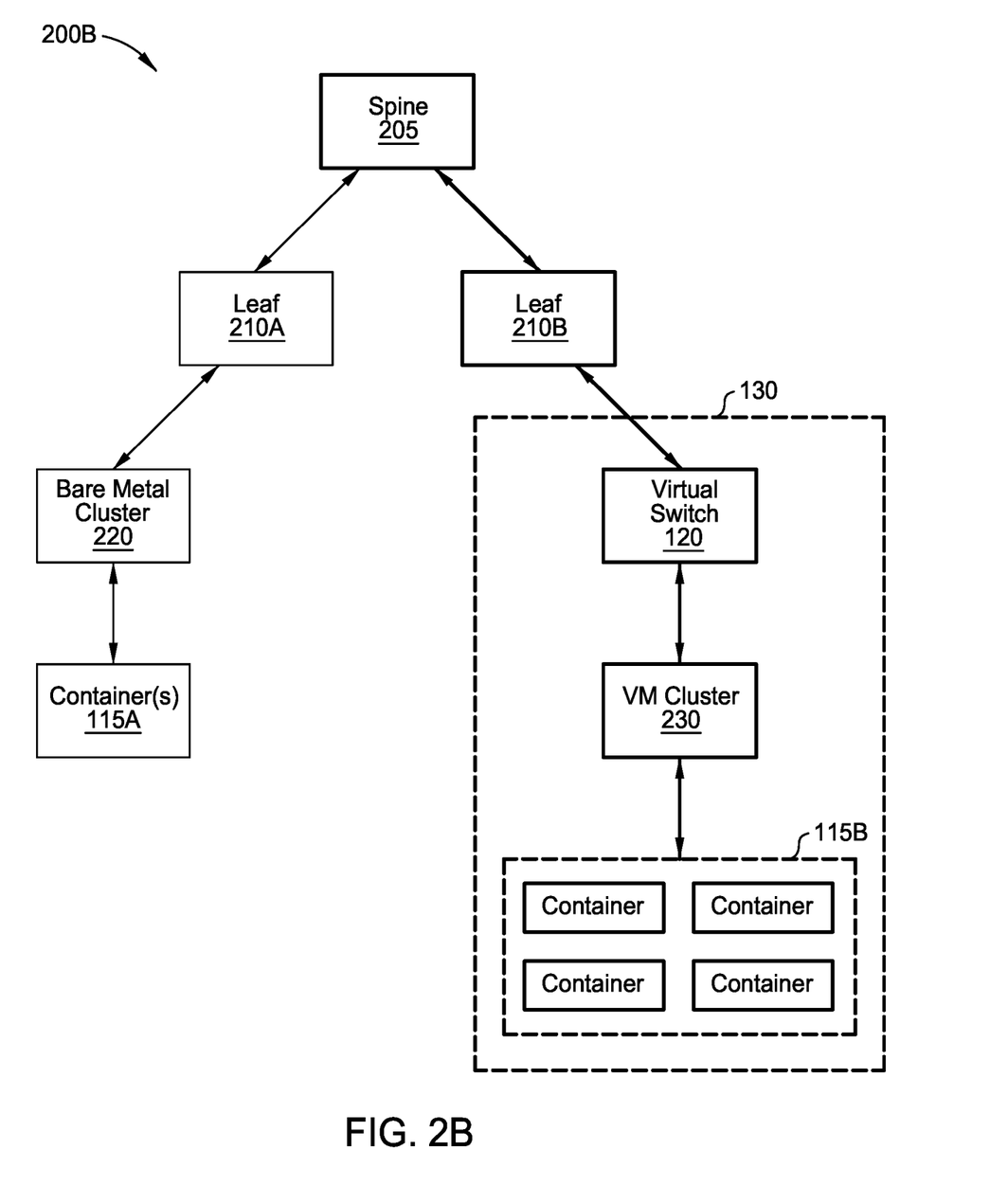
FIG. 2B depicts a network topology for a data center including a variety of physical and virtual components after selection of a component, according to some embodiments disclosed herein.

FIG. 2B depicts a Network Topology 200B for a data center including a variety of physical and virtual components after selection of a component, according to some embodiments disclosed herein. In some embodiments, the Network Topology 200B indicates relevant components when any particular component is selected (e.g., by a user interacting with a GUI). In one embodiment, when a component is selected, the system can highlight or emphasize all connected components north of the selected component (e.g., towards the spine node), as well as the immediately adjacent node(s) or component(s) south of the selected component. In the illustrated embodiment, a user has selected the VM Cluster 230, resulting in the system highlighting the connectivity north to the Spine 205, as well as the immediately-adjacent components (the Containers 115B)

Upon receiving this selection, in the illustrated embodiment, the Network Topology 200B is revised and output to depict all of the Containers 115B in the cluster. Additionally, as illustrated by the emphasized connections and components, the Network Topology 200B indicates the connectivity of the VM Cluster 230. In this way, the user can readily perceive which components are relevant to the cluster. In the illustrated embodiment, these include the Switch 120C, Leaf 210B, and Spine 205. This allows any issues to be identified and rectified quickly. For example, suppose one or more Containers 115B in the VM Cluster 230 are suffering connectivity issues. Upon selecting the cluster, the Network Topology 200B updates to quickly indicate which components are involved in providing connectivity to the cluster. These relevant components can then be evaluated (manually or automatically) to identify potential causes.

Although not included in the illustrated embodiments, in some embodiments the Network Topology 200B additionally indicates utilization and other information about each node and/or connection relevant to the selection. For example, the Network Topology 200B may alter the color or other aspect of the visualization of each communication link associated with the selected VM Cluster 230 based on the bandwidth over the link (overall, or as a percentage of the maximum bandwidth). Similarly, the Network Topology 200B may color or otherwise change the depiction of each relevant component (e.g., the Switch 120C) based on its utilization (e.g., memory usage, processor usage, and the like).

Figure 2C:
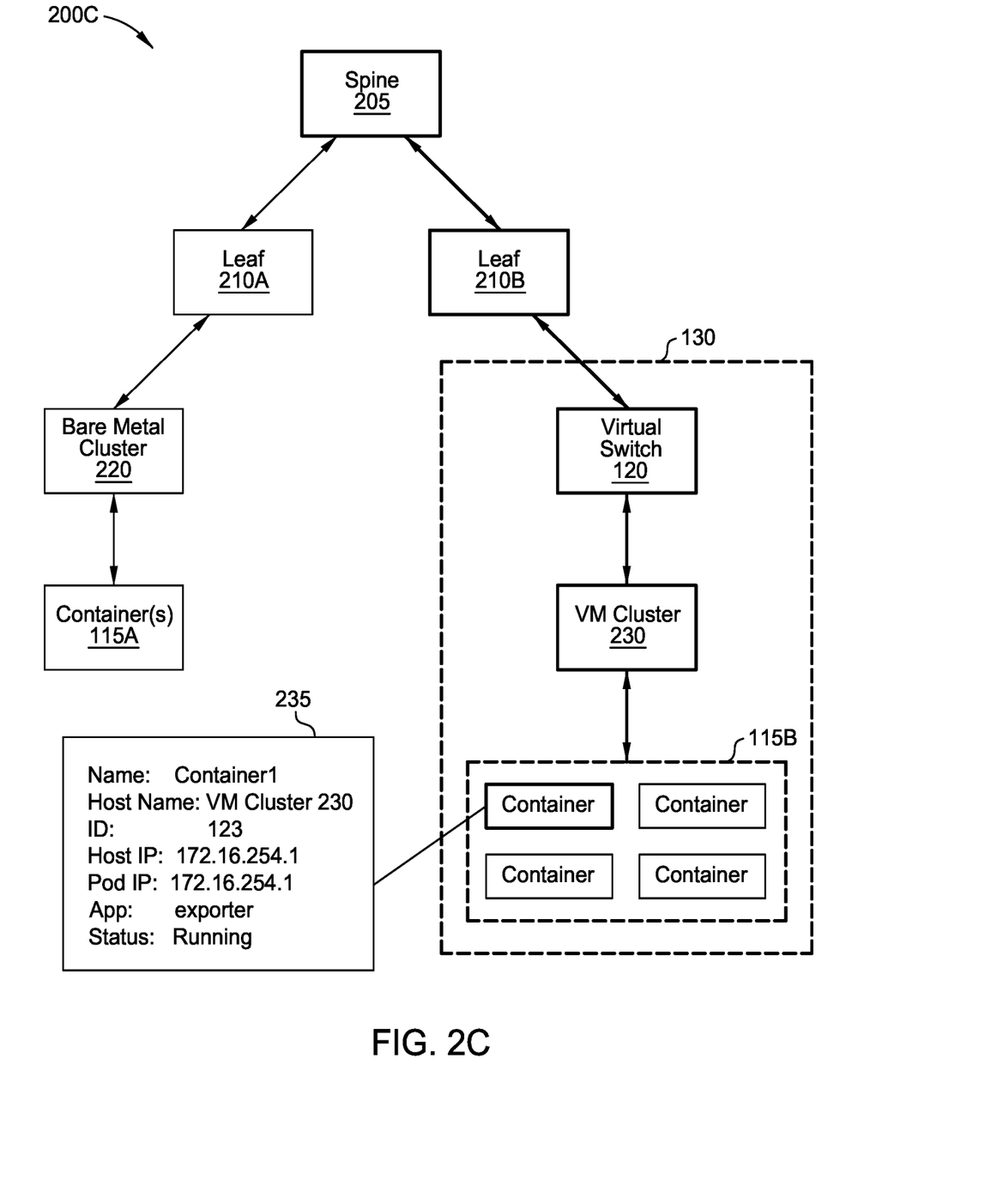
FIG. 2C depicts a network topology for a data center including a variety of physical and virtual components after selection of a component, according to some embodiments disclosed herein.

FIG. 2C depicts a Network Topology 200C for a data center including a variety of physical and virtual components after selection of a component, according to some embodiments disclosed herein. In the illustrated embodiment, a single container in the VM Cluster 230 has been selected. As illustrated, in response to this selection, the Network Topology 200C has been updated to include Information 235 about the selected container. In the illustrated embodiment, this Information 235 includes the name of the container, a name of the host where the pod/collection of containers is executing (which may be a virtual machine or a bare metal cluster, in one embodiment), an identifier of the container, the host IP for the container, the pod IP for the container (which may or may not be in the same subnet as the host), the application(s) associated with the container or executing on the container, and the current status of the container (e.g., running, restarting, paused, stopper, failed, and the like).

Figure 3:
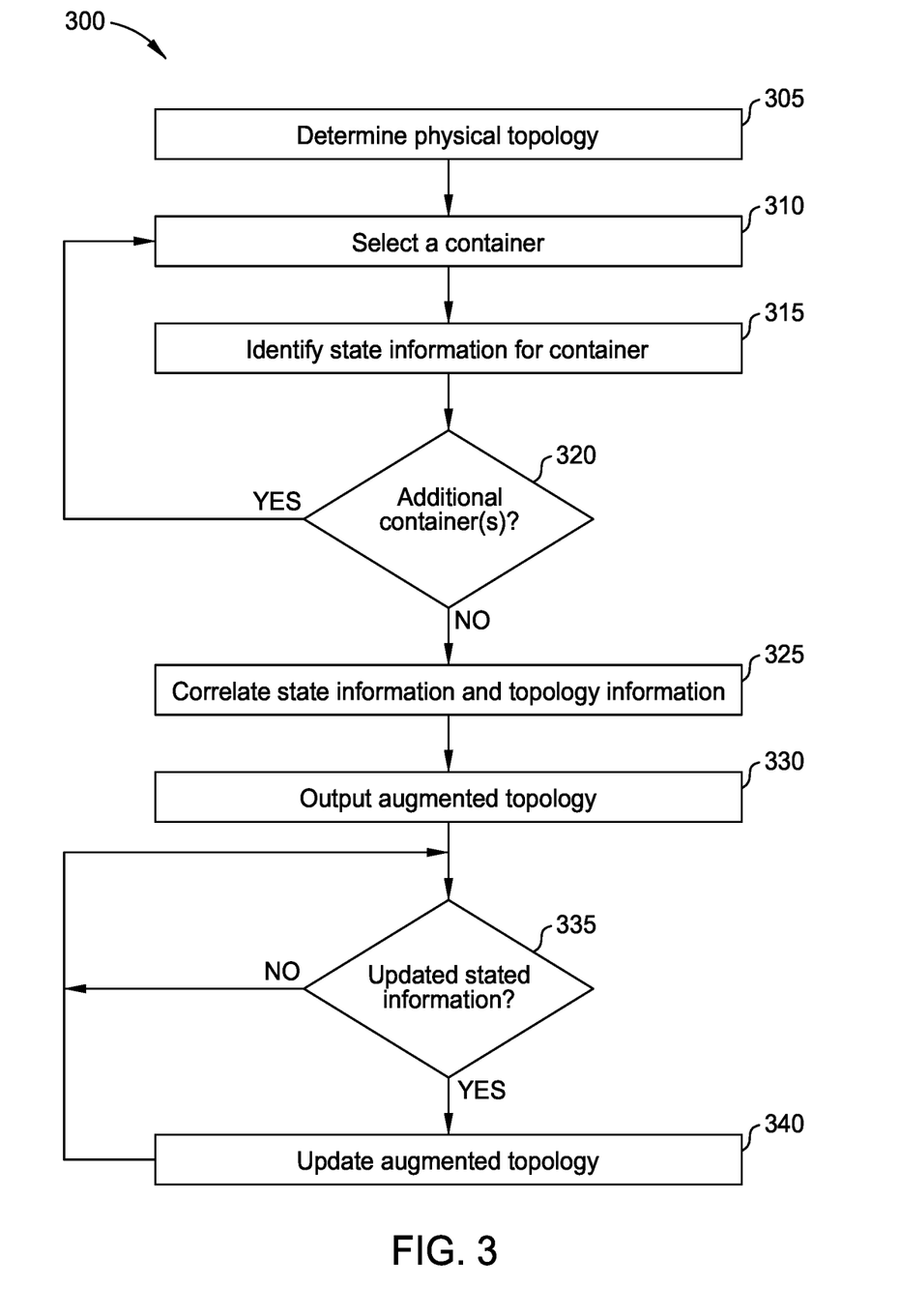
FIG. 3 is a flow diagram illustrating a method for generating augmented topologies for a data center including a variety of physical and virtual components, according to some embodiments disclosed herein.

FIG. 3 is a flow diagram illustrating a method 300 for generating augmented topologies for a data center including a variety of physical and virtual components, according to some embodiments disclosed herein. The method 300 begins at block 305, where a management component (e.g., Controller Component 105) determines the physical topology of the deployment. In some embodiments, the management component does so using one or more link layer discovery protocols to identify the neighbor component(s) of each component in the deployment. This allows the management component to build a hierarchical network topology map of the physical components and connections in the data center.

At block 310, the management component selects one of the containers hosted in the data center. In one embodiment, the management component can identify the containers in the data center via the orchestrators. For example, the management component may request each orchestrator provide a list of the containers it supports. In some embodiments, the management component similarly retrieves state information for each container from the corresponding orchestrator.

The method 300 continues to block 315, where the management component identifies state information for the selected container. In one embodiment, the management component can retrieve this information directly from the container (e.g., via one or more APIs). In another embodiment, the management component receives this state information from the orchestrator of the selected container. In an embodiment, the state information can include, by way of example and without limitation, the current state of the container (e.g., running or stopped), the resource or bandwidth utilization of the container, and the like. In embodiments, the state information additionally includes a host address or identifier for the container. Using this information, the management component can identify the physical component(s) (e.g., the physical server) executing the selected container.

Although container information is given as one example of data that can be used to augment the network topology, in embodiments, a wide variety of data can be utilized. This can include, for example, namespace data, ingress data, service data, and the like.

At block 320, the management component determines whether there is at least one additional container that has not yet been evaluated. If so, the method 300 returns to block 310. In this way, the management component can collect state information for all containers in the deployment, regardless of the particular cluster each is associated with.

If the management component has received state information for each container, the method 300 continues to block 325. At block 325, the management component correlates the received state information with the topology information determined in block 305 (e.g., the information about the neighbors of each component). For example, the management component may identify, for each container, which physical server is hosting the container. The container can then be added to the topology to yield an augmented topology reflecting the connections among the containers and other components. In some embodiments, the management component also includes state information in the augmented topology (e.g., adjusting the emphasis or color of each component based on its utilization).

The method 300 then proceeds to block 330, where the management component outputs the augmented topology. In one embodiment, this includes outputting the augmented network topology on a GUI, allowing users to visually determine the relevant components and connectivity for each container, and the relationships between them.

At block 335, the management component determines whether updated state information is available. In one embodiment, the management component may periodically query for updated state information for each container (e.g., to each container directly, or via one or more orchestrators). In another embodiment, the container(s) and/or orchestrator may periodically supply updated state information without waiting for a request. If no updated information is available, the method 300 loops at block 335. If new state information has been received, however, the method 300 continues to block 340.

At block 340, the management component updates the displayed augmented topology based on the new state information. In this way, the topology is dynamically updated as conditions in the data center change, allowing rapid and targeted responses. For example, by referring to the augmented topology, the management component (or another component) may quickly identify components or links which are overburdened or which may fail, and provide solutions including activating one or more new components to take some of the load, migrating workloads or virtual machines, and the like. Additionally, in some embodiments, such actions may be suggested to a user or administrator, who may take action to prevent failures.

By using embodiments disclosed herein, the management component can provide enhanced visualizations to monitor containers and clusters in the deployment, and indicate the overall topology of the data center, including the particular components hosting each cluster or container.

Additionally, in some embodiments, the management component allows users to select and display different graphical and topological perspectives of the resources. For example, a namespace view may indicate all containers associated with a particular namespace in the deployment. Other perspectives include, without limitation, a container view, a services view, an ingress view, and the like. This can greatly enhance debugging and monitoring of the deployment.

Generally, each different view provides a different perspective of the same system and its topology. Each view can be used to look at the system in simplified way. For example, the namespace view will only show the "namespaces" in the cluster, while an "all" view will show both namespaces and containers scoped under each namespace. In one embodiment, a "service" view indicates how a set of containers of the same application type (e.g., when an application is running with multiple replicas) are working together. Other examples of available views can include, without limitation, viewing the topology based on name, container or host IP, individual subnets, resource utilization, and the like.

In some embodiments, by correlating the topological information with the state information, the management component can output a complete indication of the networking connectivity for each container, including both north-south and east-west connectivity, from the perspective of the data center. Additionally, as discussed above, the management component can provide support to monitor and visualize of both VM-based clusters and containers, as well as bare-metal-based deployments. In one embodiment, the augmented topology displays the configuration and operational state of each node and resource (such as a container, namespace, service, and the like) as well as an aggregate view of how each interacts.

In an embodiment, the management component does not require an agent or other component on the cluster nodes. That is, the management component can build the augmented topology based on state information each container already provides, and need not install additional components to provide the augmented topology.

In some embodiments, the management component can provide a tabular view of the components in the deployment. For example, the management component may provide a list of the containers, and allow users to filter or search to identify relevant container(s) matching provided criteria. In at least one embodiment, as the user does so, the augmented topology is updated (e.g., to highlight or otherwise emphasize the containers that meet the criteria, and/or to de-emphasize or hide the containers that do not).

Figure 4:
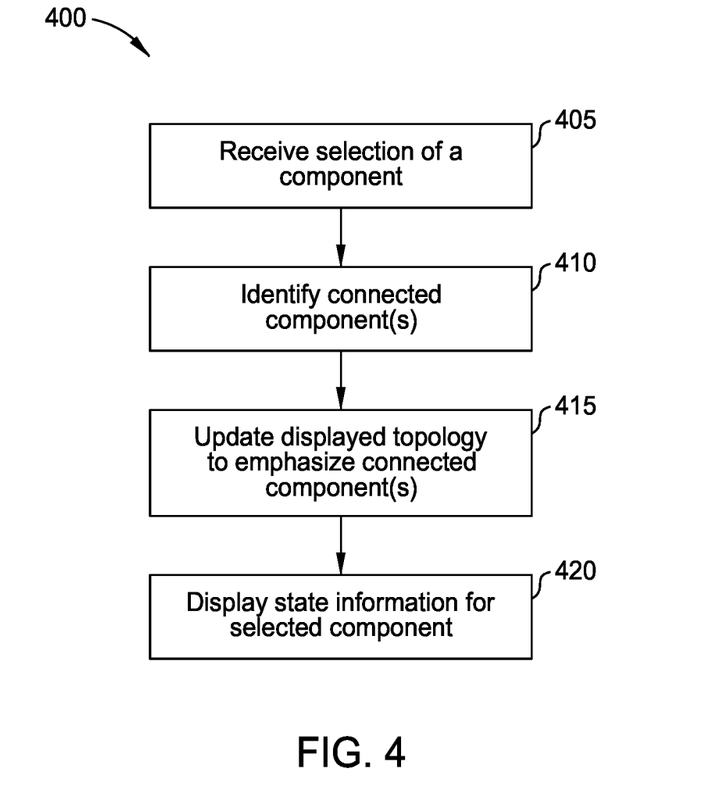
FIG. 4 is a flow diagram illustrating a method for dynamically modifying augmented topologies for a data center including a variety of physical and virtual components, according to some embodiments disclosed herein.

FIG. 4 is a flow diagram illustrating a method 400 for dynamically modifying augmented topologies for a data center including a variety of physical and virtual components, according to some embodiments disclosed herein. The method 400 begins at block 405, where a management component receives a selection of one or more components in an augmented topology. For example, after outputting the topology for display on a GUI, a user may click or otherwise select a component (e.g., a cluster or container).

At block 410, the management component uses the augmented topology to identify components that are connected to the selected component. That is, the management component identifies other components that are communicatively coupled to the selected component, either directly or through one or more intermediaries. In some embodiments, these are referred to as "relevant" components. For example, if a container is selected, the management component can identify the server hosting the container, the switch connected to the server, and so on.

The method 400 then continues to block 415, where the management component updates the displayed topology to reflect these connections by emphasizing the connected components. For example, the management component may change the color of the connected components and/or the other (unconnected) components, highlight the connected components, hide the unconnected components, and the like. At block 420, the management component further displays any available state information for the selected components, such as its ID, current resource utilization, and the like. In this way, the management component provides dynamic information about the deployment to aid debugging and configuration.

Figure 5:
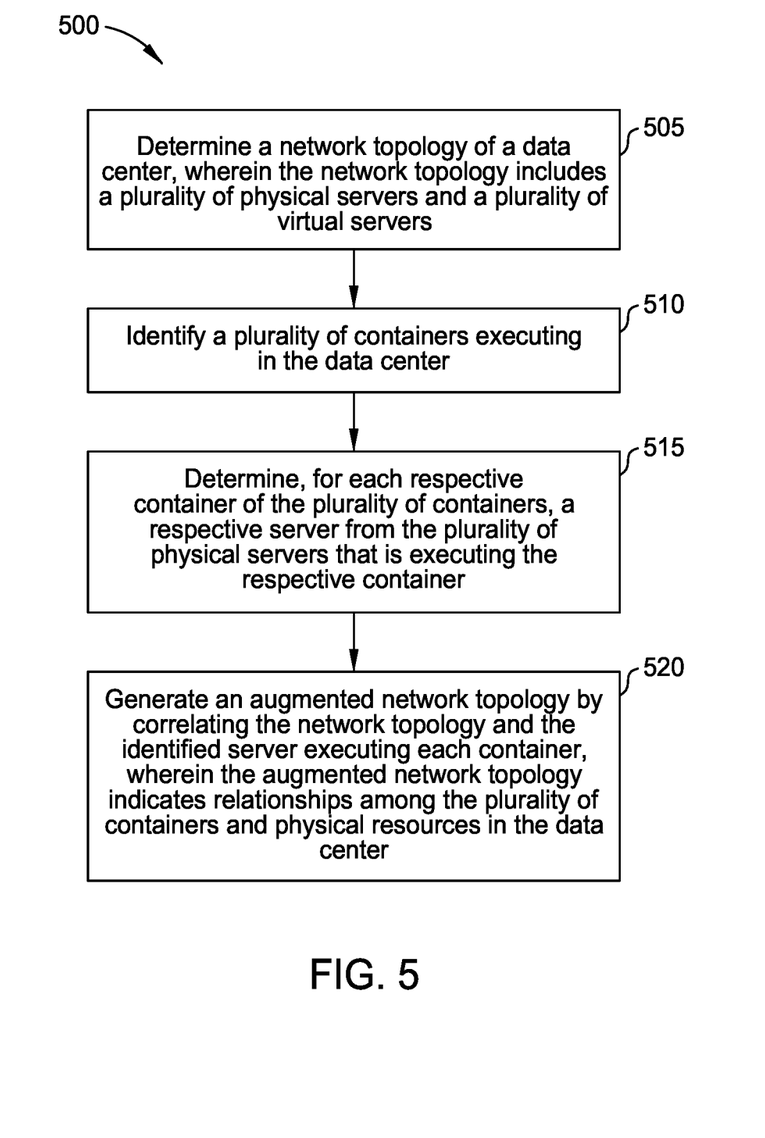
FIG. 5 is a flow diagram illustrating a method for generating augmented topologies for a data center, according to some embodiments disclosed herein.

FIG. 5 is a flow diagram illustrating a method 500 for generating augmented topologies for a data center, according to some embodiments disclosed herein. The method 500 begins at block 505, where a management component determines a network topology of a data center, wherein the network topology includes a plurality of physical servers and a plurality of virtual servers. At block 510, the management component identifies a plurality of containers executing in the data center. The method 500 continues to block 515, where the management component determines, for each respective container of the plurality of containers, a respective server from the plurality of physical servers that is executing the respective container. Additionally, at block 520, the management component generates an augmented network topology by correlating the network topology and the identified server executing each container. In some embodiments, the augmented network topology indicates relationships among the plurality of containers and physical resources in the data center.

Figure 6:
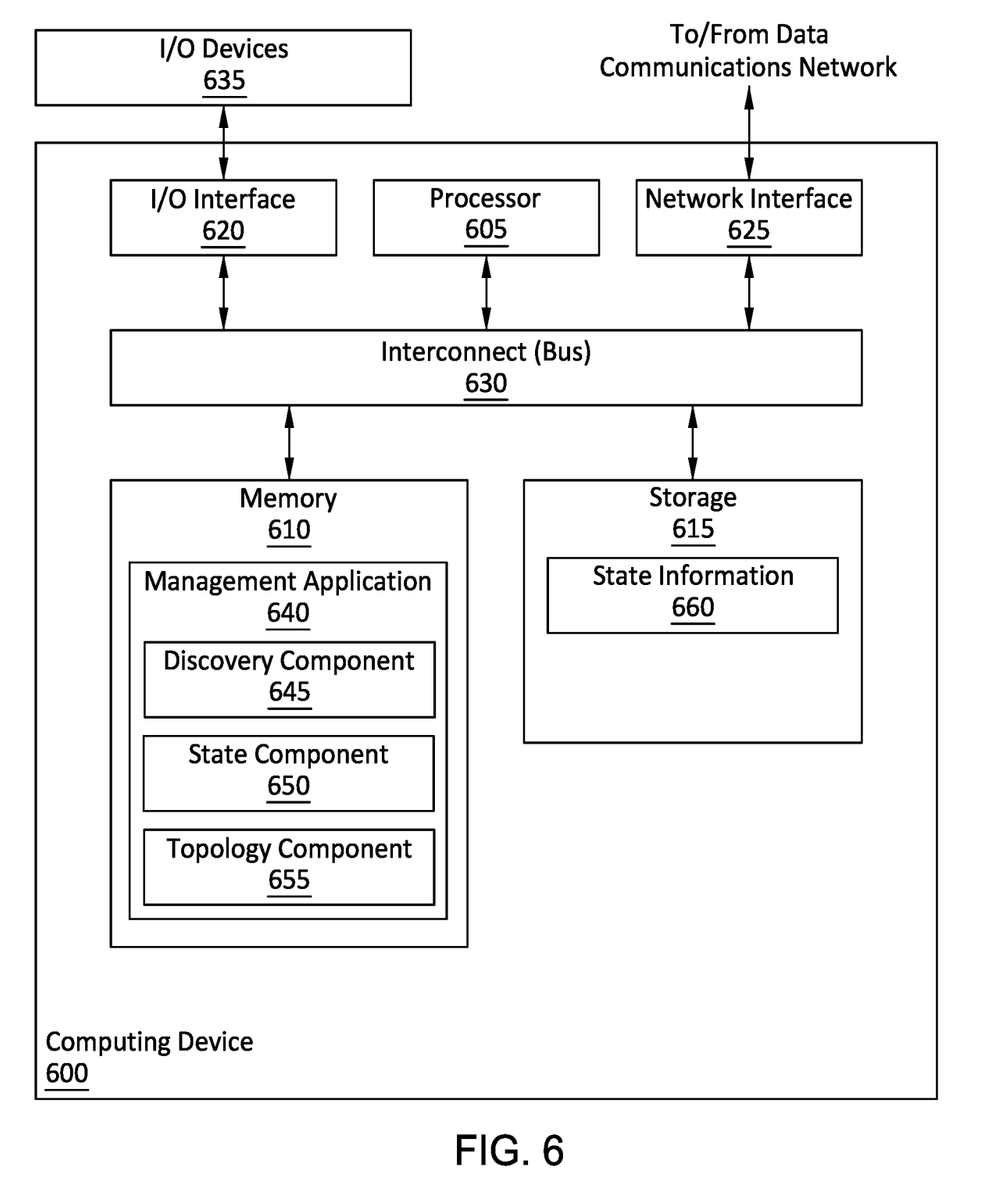
FIG. 6 is a block diagram illustrating a computing device configured to generate augmented topologies for data centers including a variety of physical and virtual components, according to some embodiments disclosed herein.

FIG. 6 is a block diagram illustrating a Computing Device 600 configured to generate augmented topologies for data centers including a variety of physical and virtual components, according to some embodiments disclosed herein. In one embodiment, the Computing Device 600 corresponds to a management component in a data center (e.g., Controller Component 105). Although depicted as a physical device, in embodiments, the Computing Device 600 may be implemented as a virtual device or service, or across a number of devices (e.g., in a cloud environment). As illustrated, the Computing Device 600 includes a Processor 605, Memory 610, Storage 615, I/O Interface 620, and a Network Interface 625. In the illustrated embodiment, the Processor 605 retrieves and executes programming instructions stored in Memory 610, as well as stores and retrieves application data residing in Storage 615. The Processor 605 is generally representative of a single CPU, a GPU, a CPU and a GPU, multiple CPUs, multiple GPUs, a single CPU or GPU having multiple processing cores, and the like. The Memory 610 is generally included to be representative of a random access memory. Storage 615 may be any combination of memory or storage components, including (but not limited to) disk drives, flash-based storage devices, and the like, and may include fixed storage devices, removable storage devices or a combination both, such as fixed disk drives, removable memory cards, caches, optical storage, network attached storage (NAS), or storage area networks (SAN).

In some embodiments, I/O Devices 635 (such as a mouse, a keyboard, a monitor, a touchscreen, etc.) are connected via the I/O Interface(s) 620. Further, via the Network Interface 625, the Computing Device 600 can be communicatively coupled with one or more other devices and components (directly or indirectly) such as orchestrators, network controllers, and the like.

In the illustrated embodiment, the Storage 615 includes historical State Information 660. Although depicted as residing in Storage 615, the State Information 660 may be stored in any suitable location. In embodiments, the State Information 660 generally include historical information for the deployment. For example, the State Information 660 may indicate state information (such as utilization) for each component at various points in the past. By using the State Information 660, the Computing Device 600 may learn patterns or trends indicating that proactive actions should be taken to prevent failures or issues in the deployment.

As illustrated, the Memory 610 includes a Management Application 640. Although depicted as software residing in Memory 610, in embodiments, the functionality of the Management Application 640 may be implemented using hardware, software, or a combination of hardware and software. As illustrated, the Management Application 640 includes a Discovery Component 645, a State Component 650, and a Topology Component 655. Although depicted as discrete components for conceptual clarity, in embodiments, the operations of the Discovery Component 645, State Component 650, and Topology Component 655 may be combined or distributed across any number of components.

The Discovery Component 645 generally utilizes one or more neighbor discovery protocols (e.g., LLDP or CDP) to determine the physical topology of the data center, including the physical connections among the components. This allows the Discovery Component 645 to construct a network topology. The State Component 650 generally retrieves state or deployment information for logical nodes in the data center (e.g., containers). For example, the State Component 650 may utilize one or more APIs provided by each container, and/or request information from the orchestrator(s). In an embodiment, the Topology Component 655 correlates the information gathered by the Discovery Component 645 and the State Component 650 to generate augmented topologies that reflect the connectivity of the data center, including how the container(s) map to the physical resources in the deployment. This augmented topology can be utilized to enhance debugging and troubleshooting in the data center.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
   determining, by a management component in a data center, a network topology of the data center, wherein the network topology includes a plurality of physical servers;
   identifying, by the management component, a plurality of containers executing in the data center, wherein the plurality of containers are distributed across a plurality of clusters;
   determining, for each respective container of the plurality of containers, a respective server from the plurality of physical servers that is executing the respective container;
   generating, by the management component, an augmented network topology by correlating the network topology and the determined server executing each container, wherein:
      the augmented network topology indicates relationships among the plurality of clusters and physical resources in the data center, and
      communication links in the data center are colored in the augmented network topology to indicate, for each respective communication link, a respective consumed bandwidth of the respective link as a percentage of a respective maximum bandwidth of the respective link; and upon receiving a selection of a first cluster of the plurality of clusters:
  identifying a set of containers, from the plurality of containers, included in the first cluster;
  updating a visualization of the augmented network topology to display the set of containers; and
  updating the visualization of the augmented network topology to display a set of connected components for the first cluster, comprising:
    visually emphasizing, in the visualization, all connected components north of the first cluster to a spine node;
    visually emphasizing, in the visualization, an immediately-adjacent component south of the first cluster; and
    hiding, in the visualization, at least one component that is unconnected to the first cluster.

2. The method of claim 1, wherein determining the network topology comprises:
  instructing components in the data center to use a discovery protocol to identify neighbor information; and
  aggregating the neighbor information to build the network topology, wherein the network topology indicates connections between physical components in the data center.

3. The method of claim 1, wherein the plurality of containers are distributed across a plurality of clusters, wherein each respective cluster of the plurality of clusters is associated with a respective orchestrator, and wherein the management component receives state information from each orchestrator.

4. The method of claim 1, wherein determining the server that is executing each container comprises querying each container to retrieve state information.

5. The method of claim 4, wherein the augmented network topology reflects the state information for each of the plurality of containers.

6. The method of claim 1, the method further comprising:
  outputting the augmented network topology for display on a graphical user interface (GUI).

7. The method of claim 6, the method further comprising:
  receiving a selection of a first container from the set of containers included in the first cluster; and
  highlighting, on the GUI, components in the augmented network topology that are linked to the first container.

8. The method of claim 6, the method further comprising:
  receiving utilization information for each of the plurality of containers; and
  updating the GUI to provide a visualization of the utilization information on the augmented network topology.

9. A non-transitory computer-readable medium containing computer program code that, when executed by operation of one or more computer processors, performs an operation comprising:
  determining, by a management component in a data center, a network topology of the data center, wherein the network topology includes a plurality of physical servers;
  identifying, by the management component, a plurality of containers executing in the data center, wherein the plurality of containers are distributed across a plurality of clusters;
  determining, for each respective container of the plurality of containers, a respective server from the plurality of physical servers that is executing the respective container; and
  generating, by the management component, an augmented network topology by correlating the network topology and the determined server executing each container, wherein:
    the augmented network topology indicates relationships among the plurality of clusters and physical resources in the data center, and
    communication links in the data center are colored in the augmented network topology to indicate, for each respective communication link, a respective consumed bandwidth of the respective link as a percentage of a respective maximum bandwidth of the respective link; and
  upon receiving a selection of a first cluster of the plurality of clusters:
    identifying a set of containers, from the plurality of containers, included in the first cluster;
    updating a visualization of the augmented network topology to display the set of containers; and
    updating the visualization of the augmented network topology to display a set of connected components for the first cluster, comprising:
      visually emphasizing, in the visualization, all connected components north of the first cluster to a spine node;
      visually emphasizing, in the visualization, an immediately-adjacent component south of the first cluster; and
      hiding, in the visualization, at least one component that is unconnected to the first cluster.

10. The non-transitory computer computer-readable medium of claim 9, wherein determining the network topology comprises:
  instructing components in the data center to use a discovery protocol to identify neighbor information; and
  aggregating the neighbor information to build the network topology, wherein the network topology indicates connections between physical components in the data center.

11. The non-transitory computer computer-readable medium of claim 9, wherein determining the server that is executing each container comprises querying each container to retrieve state information, and wherein the augmented network topology reflects the state information for each of the plurality of containers.

12. The non-transitory computer computer-readable medium of claim 9, the operation further comprising:
  outputting the augmented network topology for display on a graphical user interface (GUI).

13. The non-transitory computer computer-readable medium of claim 12, the operation further comprising:
  receiving a selection of a first container from the set of containers included in the first cluster; and
  highlighting, on the GUI, components in the augmented network topology that are linked to the first container.

14. The non-transitory computer computer-readable medium of claim 13, the operation further comprising:
  receiving utilization information for each of the plurality of containers; and
  updating the GUI to provide a visualization of the utilization information on the augmented network topology.

15. A system, comprising:
  one or more computer processors; and a memory containing a program which when executed by the one or more computer processors performs an operation, the operation comprising:

determining, by a management component in a data center, a network topology of the data center, wherein the network topology includes a plurality of physical servers;

identifying, by the management component, a plurality of containers executing in the data center;

determining, for each respective container of the plurality of containers, a respective server from the plurality of physical servers that is executing the respective container; and generating, by the management component, an augmented network topology by correlating the network topology and the determined server executing each container, wherein:

the augmented network topology indicates relationships among the plurality of clusters and physical resources in the data center, and communication links in the data center are colored in the augmented network topology to indicate, for each respective communication link, a respective consumed bandwidth of the respective link as a percentage of a respective maximum bandwidth of the respective link; and upon receiving a selection of a first cluster of the plurality of clusters:

identifying a set of containers, from the plurality of containers, included in the first cluster;

updating a visualization of the augmented network topology to display the set of containers; and updating the visualization of the augmented network topology to display a set of connected components for the first cluster, comprising:

visually emphasizing, in the visualization, all connected components north of the first cluster to a spine node;

visually emphasizing, in the visualization, an immediately-adjacent component south of the first cluster; and hiding, in the visualization, at least one component that is unconnected to the first cluster.

16. The system of claim 15, wherein determining the network topology comprises:

instructing components in the data center to use a discovery protocol to identify neighbor information; and aggregating the neighbor information to build the network topology, wherein the network topology indicates connections between physical components in the data center.

17. The system of claim 15, wherein determining the server that is executing each container comprises querying each container to retrieve state information, and wherein the augmented network topology reflects the state information for each of the plurality of containers.

18. The system of claim 15, the operation further comprising:

outputting the augmented network topology for display on a graphical user interface (GUI).

19. The system of claim 18, the operation further comprising:

receiving a selection of a first container from the set of containers included in the first cluster; and highlighting, on the GUI, components in the augmented network topology that are linked to the first container.

20. The system of claim 19, the operation further comprising:

receiving utilization information for each of the plurality of containers; and updating the GUI to provide a visualization of the utilization information on the augmented network topology.

* * * * *

UNITED STATES PATENT AND TRADEMARK OFFICE
CERTIFICATE OF CORRECTION

PATENT NO. : 11,451,447 B1  
APPLICATION NO. : 16/951673  
DATED : September 20, 2022  
INVENTOR(S) : Anil B. Jangam et al.

Page 1 of 1

It is certified that error appears in the above-identified patent and that said Letters Patent is hereby corrected as shown below:

On the Title Page

In item (56), in Column 2, under "Other Publications", Line 3, delete "Kubemetes" and insert -- Kubernetes --.
In item (56), in Column 2, under "Other Publications", Line 6, delete "Acccessed" and insert -- Accessed --.

In the Specification

In Column 1, Line 22, delete "xj_b" and insert -- xjb --.
In Column 1, Line 27, delete "xj_b" and insert -- xjb --.
In Column 8, Line 10, delete "115B)" and insert -- 115B). --.
In Column 8, Line 21, delete "1158" and insert -- 115B --.
In Column 13, Line 30, delete "computer readable" and insert -- computer-readable --.
In Column 13, Line 30, delete "computer readable" and insert -- computer-readable --.
In Column 13, Line 32, delete "computer readable" and insert -- computer-readable --.
In Column 14, Line 5, delete "computer readable" and insert -- computer-readable --.
In Column 14, Line 8, delete "computer readable" and insert -- computer-readable --.

In the Claims

In Column 16, Line 35 (First Occurrence), in Claim 10, after "transitory" delete "computer".
In Column 16, Line 44 (First Occurrence), in Claim 11, after "transitory" delete "computer".
In Column 16, Line 50 (First Occurrence), in Claim 12, after "transitory" delete "computer".
In Column 16, Line 54 (First Occurrence), in Claim 13, after "transitory" delete "computer".
In Column 16, Line 60 (First Occurrence), in Claim 14, after "transitory" delete "computer".

Signed and Sealed this  
Fifteenth Day of November, 2022

Katherine Kelly Vidal  
*Director of the United States Patent and Trademark Office*